United States Patent
Gosselin et al.

(10) Patent No.: US 9,002,334 B2
(45) Date of Patent: Apr. 7, 2015

(54) SYSTEMS AND METHODS FOR DELIVERING MULTIMEDIA INFORMATION TO MOBILE DEVICES

(71) Applicant: Cequint, Inc., Seattle, WA (US)

(72) Inventors: Mark H. Gosselin, Seattle, WA (US); James Stephanick, Seattle, WA (US); Jeffrey S. Ross, Erie, CO (US)

(73) Assignee: Cequint, Inc., Seattle, WA (US)

( * ) Notice: Subject to any disclaimer, the term of this patent is extended or adjusted under 35 U.S.C. 154(b) by 36 days.

(21) Appl. No.: 13/802,055

(22) Filed: Mar. 13, 2013

(65) Prior Publication Data

US 2014/0274000 A1 Sep. 18, 2014

(51) Int. Cl.
*H04M 3/436* (2006.01)

(52) U.S. Cl.
CPC .................................. *H04M 3/4365* (2013.01)

(58) Field of Classification Search
USPC .............. 455/415, 459, 461, 428, 445, 435.2; 370/328, 352–356, 360; 725/25
See application file for complete search history.

(56) References Cited

U.S. PATENT DOCUMENTS

| | | | |
|---|---|---|---|
| 6,088,796 A * | 7/2000 | Cianfrocca et al. | 713/152 |
| 6,574,470 B1 * | 6/2003 | Chow et al. | 455/417 |
| 8,447,970 B2 * | 5/2013 | Klein et al. | 713/155 |
| 2006/0046720 A1 | 3/2006 | Toropainen | |
| 2006/0199572 A1 | 9/2006 | Chin | |
| 2007/0136245 A1 * | 6/2007 | Hess et al. | 707/3 |
| 2007/0253543 A1 | 11/2007 | Horne | |
| 2008/0154723 A1 | 6/2008 | Ferguson | |
| 2008/0212759 A1 | 9/2008 | Bates | |
| 2008/0242293 A1 | 10/2008 | Gosselin | |
| 2009/0143052 A1 | 6/2009 | Bates | |
| 2011/0107364 A1 * | 5/2011 | Lajoie et al. | 725/25 |
| 2012/0282907 A1 | 11/2012 | Holt | |

OTHER PUBLICATIONS

International Search Report and Written Opinion mailed Jun. 26, 2014, issued in corresponding International Application No. PCT/US2014/023670, filed Mar. 11, 2014, 10 pages.

* cited by examiner

*Primary Examiner* — Kashif Siddiqui
*Assistant Examiner* — Farideh Madani
(74) *Attorney, Agent, or Firm* — Christensen O'Connor Johnson Kindness PLLC

(57) ABSTRACT

Systems and methods for distributing data associated with a caller to a mobile device, in which the caller data may be presented by the mobile device upon receiving a first incoming call from the caller, are provided. In some embodiments, an image associated with the caller may be obtained by the mobile device such that the image may be displayed along with other call screening data during a first incoming call from the caller. In some embodiments, termination of the incoming call is held by a service control point while the data is transmitted to the mobile device over a data channel. Once termination of the incoming call is released by the service control point, the mobile device receives the incoming call and may present the data as call screening information. In some embodiments, the data channel may include a warm socket.

16 Claims, 10 Drawing Sheets

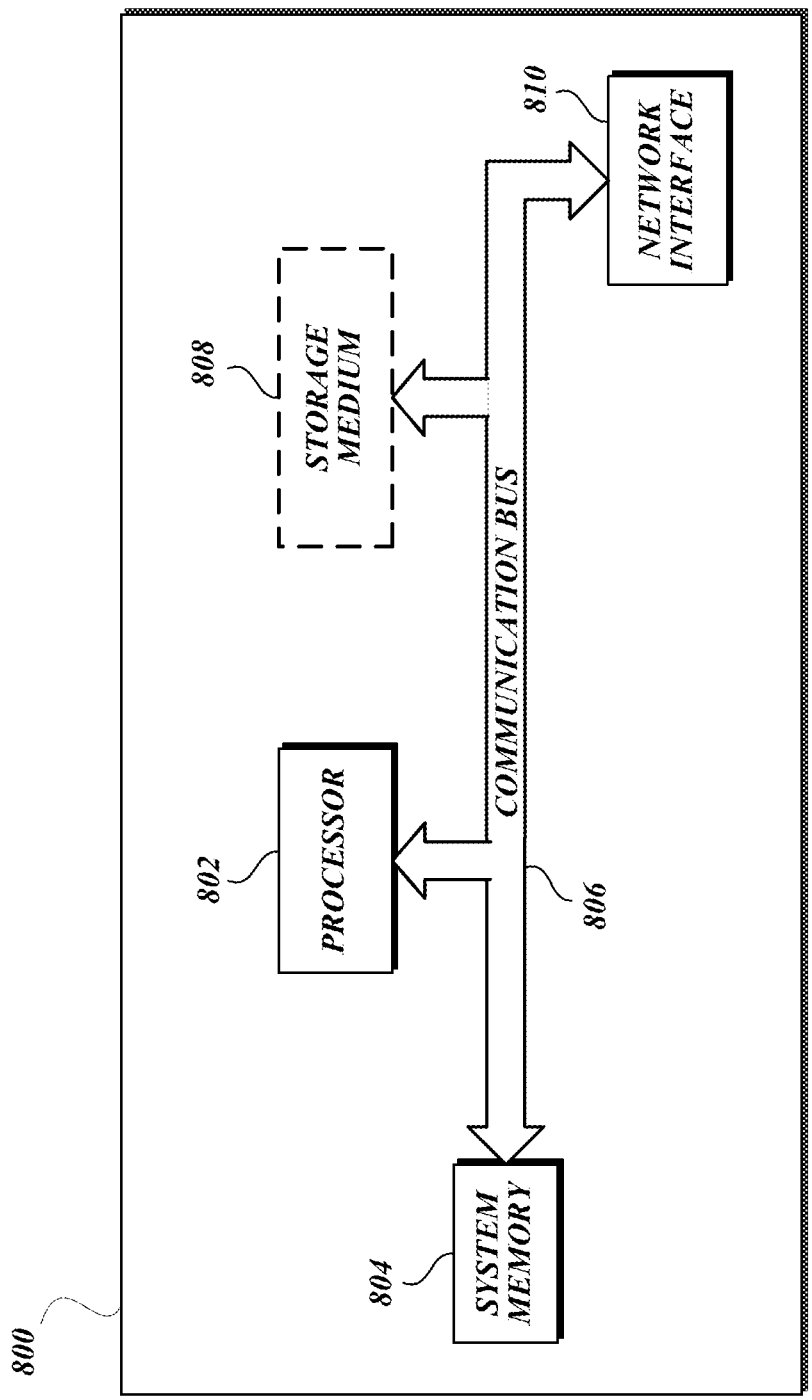

SYSTEMS AND METHODS FOR DELIVERING MULTIMEDIA INFORMATION TO MOBILE DEVICES

BACKGROUND

Mobile devices, such as smart phones and/or the like, are becoming increasingly popular. The rich interactive capabilities of mobile devices are growing, such that the same device that may be used to receive mobile telephone calls may also be used to wirelessly transmit and receive data over the Internet. However, challenges remain in several areas, most notably in receiving and presenting information associated with incoming calls for use in call screening. Currently, unless information is already present on a mobile device once a call page for a new incoming call is received, only information available in the call page, such as the caller ID number associated with the incoming call, traditional Caller ID Name (CNAM) data associated with the incoming call (which may be limited to 15 or fewer characters), and/or the like may be available for presentation as call screening data. Existing methods of transmitting additional caller data to mobile devices for use as call screening information are not capable of delivering the caller data to the terminating mobile device in time to be displayed along with the first incoming call associated with the caller. What is needed are systems and methods for delivering richer types of caller data to mobile devices, such that the caller data may be presented along with a first call from the caller as call screening information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method for transmitting call screening information to a terminating mobile device is provided. A computing device receives an origination request associated with a call to the terminating mobile device. While holding termination of the call, the computing device transmits call screening information to the terminating mobile device. The computing device transmits an origination request response to release termination of the call in response to determining that the call screening information was received by the terminating mobile device.

In some embodiments, a mobile computing device configured to perform actions for presenting call screening information along with an initial ring of an incoming call is provided. The actions comprise receiving a URL identifying a location from which call screening information can be obtained; using the URL to obtain the call screening information; storing the call screening information in a local data store; receiving a call page associated with an incoming call, wherein the call page includes an inbound mobile dialing number; using the inbound mobile dialing number to retrieve the call screening information from the local data store; and presenting the call screening information to a user of the mobile computing device before the user picks up the incoming call.

In some embodiments, a computing device comprising at least one processor and a computer-readable medium is provided. The computer-readable medium has computer-executable instructions stored thereon that, in response to execution by the at least one processor, cause the computing device to perform actions for transmitting call screening information to a terminating mobile device. The actions comprise receiving an origination request associated with a call to the terminating mobile device; while holding termination of the call, transmitting call screening information to the terminating mobile device; and transmitting an origination request response to release termination of the call in response to determining that the call screening information was received by the terminating mobile device.

DESCRIPTION OF THE DRAWINGS

The foregoing aspects and many of the attendant advantages of embodiments of the present disclosure will become more readily appreciated as the same become better understood by reference to the following detailed description, when taken in conjunction with the accompanying drawings, wherein:

FIG. 8 illustrates aspects of an exemplary computing device appropriate for use with embodiments of the present disclosure.

DETAILED DESCRIPTION

Embodiments of the present disclosure provide systems and/or methods for distributing data associated with a caller to a mobile device, in which the caller data may be presented by the mobile device upon receiving a first incoming call from the caller. For example, in some embodiments, an image associated with the caller may be obtained by the mobile device such that the image may be displayed along with other call screening data during a first incoming call from the caller, even if the caller has never previously called the mobile device. In some embodiments of the present disclosure, termination of the incoming call is held by a service control point while the data is transmitted to the mobile device over a data channel. Once termination of the incoming call is released by the service control point, the mobile device receives the incoming call and may present the data as call screening information. In some embodiments of the present disclosure, information about a caller data cache stored on the mobile device may be accessible by the service control point, and the caller data may only be sent to the mobile device when it is determined that the caller data cache does not include a most recent version of the caller data.

Mobile Telephony System

Figure 1:
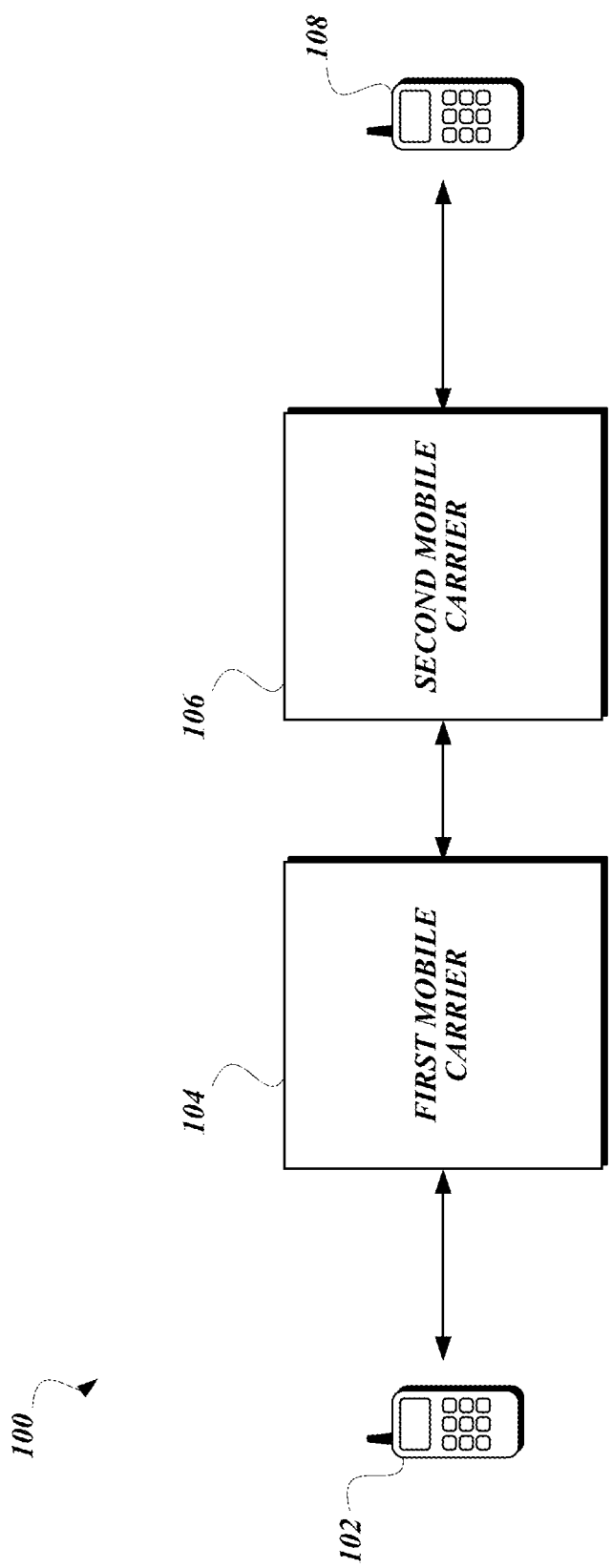
FIG. 1 is a block diagram that illustrates an overview of an exemplary embodiment of a mobile telephony system.

FIG. 1 is a block diagram that illustrates an overview of an exemplary embodiment of a mobile telephony system 100. A calling mobile device 102, such as a cell phone, smart phone, and/or the like, is associated with an account at a first mobile carrier 104 from which the calling mobile device 102 obtains wireless telephony service. A terminating mobile device 108, such as a cell phone, smart phone, and/or the like, is associated with an account at a second mobile carrier 106 from which the terminating mobile device 108 obtains wireless telephony service. When a user of the calling mobile device 102 places a call to the terminating mobile device 108, the first mobile carrier 104 connects to the second mobile carrier 106, and a communication channel is created between the calling mobile device 102 and the terminating mobile device 108 for transfer of telephony data between the devices.

In some embodiments, the first mobile carrier 104 servicing the calling mobile device 102 and the second mobile carrier 106 servicing the terminating mobile device 108 may, in fact, be the same mobile carrier. In such an embodiment, the connection between the first mobile carrier 104 and the second mobile carrier 106 is not used. In the examples below, embodiments in which the first mobile carrier 104 and the second mobile carrier 106 are separate are described primarily for ease of discussion, but one of ordinary skill in the art will appreciate that such examples may also be used in embodiments in which the first mobile carrier 104 and the second mobile carrier 106 are the same mobile carrier.

Figure 2:
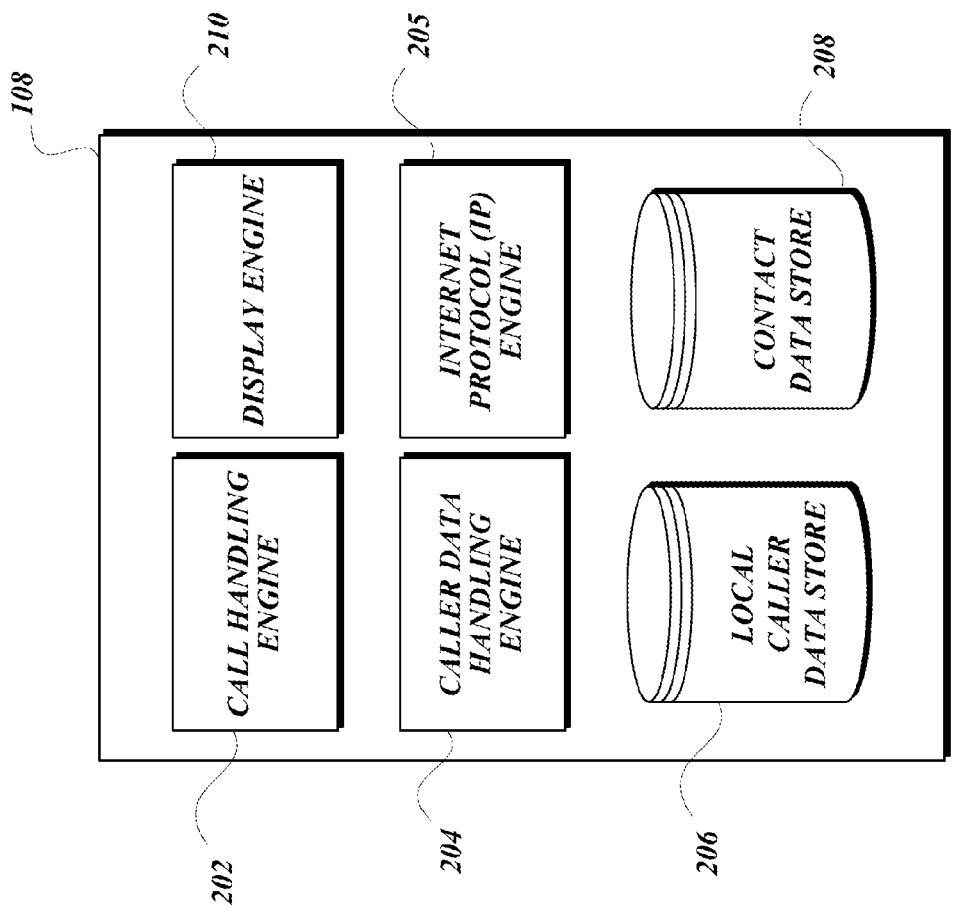
FIG. 2 is a block diagram that illustrates components of an exemplary embodiment of a terminating mobile device according to various aspects of the present disclosure.

FIG. 2 is a block diagram that illustrates components of an exemplary embodiment of a terminating mobile device 108 according to various aspects of the present disclosure. The terminating mobile device 108 includes a call handling engine 202, a display engine 210, a caller data retrieval engine 204, and an internet protocol (IP) engine 205. The call handling engine 202 may be configured to receive an incoming call page from the second mobile carrier 106. Once the call handling engine 202 receives the call page, the call handling engine 202 may instruct the display engine 210 to present information associated with the call page, such as a mobile dialing number (MDN) value included with the call page, data stored in a local caller data store 206 in association with the MDN, and/or the like, to a user. The caller data retrieval engine 204 may receive an indication that additional caller data for a caller associated with the MDN is available, and may obtain such caller data from the service control point 312, and may do at any time. That is, in some embodiments, the caller data retrieval engine 204 may receive an indication that additional caller data is available and request the data from the service control point 312 during the call, including during the incoming call sequence before the call is picked up by a user of the terminating mobile device 108.

The terminating mobile device 108 may also include a local caller data store 206 and a contact data store 208. Once the caller data retrieval engine 204 obtains additional caller data, the caller data retrieval engine 204 may store the additional caller data along with the MDN in the local caller data store 206 for display during a subsequent call. The stored caller data may be updated by the caller data retrieval engine 204 when the stored data has become stale, such as after a set number of calendar days, after the MDN has not been used in at least a set number of calendar days, and/or the like.

The caller data retrieval engine 204 may also provide a user the option of storing the additional caller data in a contact data store 208 so that the user may associate the additional caller data with an entry in a contact list. The presence of such information in the contact data store 208 for a given MDN may be used to prevent, override, or cancel the caller data retrieval engine 204 from retrieving further information from the service control point 308 when appropriate, such as when it is deemed important to conserve use of the data channel, bandwidth usage, battery power, and/or the like.

As recognized by one of ordinary skill in the art, the mobile carriers 104, 106 and the terminating mobile device 108 may utilize further components in addition to the ones illustrated herein, and/or components illustrated herein as separate components may be merged to form unitary components, without departing from the scope of the present disclosure.

In some embodiments, the calling mobile device 102, the terminating mobile device 108, the first mobile carrier 104, the second mobile carrier 106, and/or individual components thereof may be implemented using one or more computing devices, as discussed further below with respect to FIG. 8. In some embodiments, the separate illustrated components of the second mobile carrier 106 may be combined within a single computing device, or may be implemented on separate computing devices that communicate via a local area network, a wide area network, a WiFi network, and/or any other suitable communication technique. Communication between the calling mobile device 102 and the first mobile carrier 104 may occur via any suitable telephony protocol.

Embodiments of the present disclosure may use an incoming telephone number, denominated as a calling line identification (CLID), automatic number identification (ANI), caller identification (CID), and/or the like by various network standards, as an MDN. The CLID, ANI, CID, and/or the like is provided as a standard interoperability practice by many types of telephone networks, and therefore one of ordinary skill in the art will recognize that embodiments of the present disclosure may be used with incoming calls from many types of networks. For example, the incoming call may be made using conventional analog telephone networks, cellular networks, IP-based networks, VoIP networks, and/or the like. In this regard, the calling mobile device 102 and the first mobile carrier 104 are merely examples illustrating the initiation of an incoming call and an associated number. These illustrations are exemplary only, and should not be construed as limiting.

Caller Data Distribution

Figure 3:
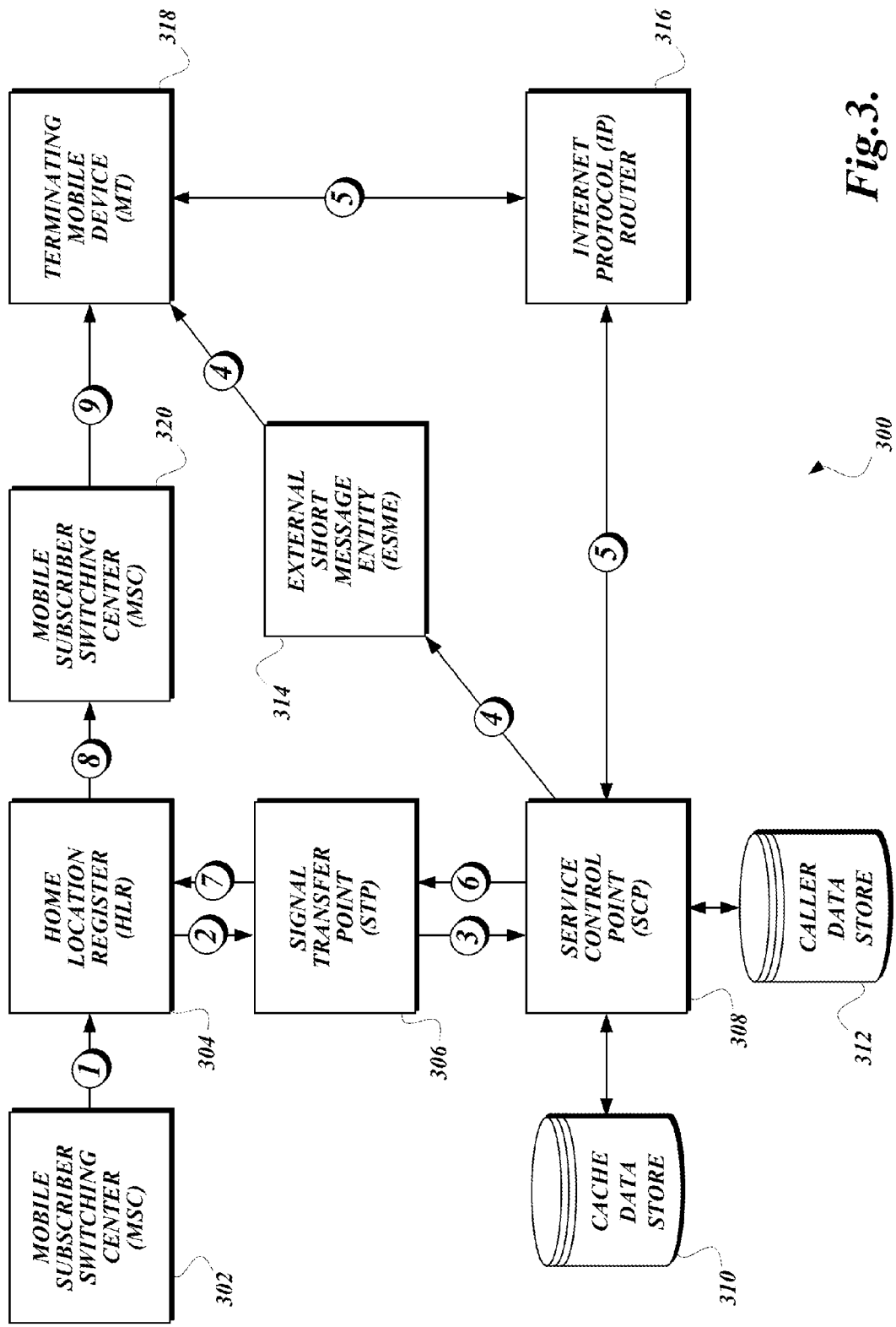
FIG. 3 is a block diagram that illustrates an exemplary embodiment of a mobile telephony system for delivering caller data to a terminating mobile device according to various aspects of the present disclosure.

FIG. 3 is a block diagram that illustrates an exemplary embodiment of a mobile telephony system 300 for delivering caller data to a terminating mobile device 318 according to various aspects of the present disclosure. The system 300 may include one or more mobile subscriber switching centers 302, 320, a home location register 304, a signal transfer point 306, a service control point 308, an external short messaging entity 314, and an internet protocol (IP) router 316. While the primary functionality of each of these components is well known to those of ordinary skill in the art of mobile telephony systems, brief overviews of the functionality of each component will be provided.

The mobile subscriber switching centers 302, 320 are configured to set up and release an end-to-end connection between a calling device and the terminating mobile device 318. As one example, the mobile subscriber switching center 320 may be responsible for providing base wireless services to, and providing the direct connection with, the terminating mobile device 318. The home location register 304 is configured to determine, based on an MDN associated with an incoming call and/or an international mobile subscriber identity (IMSI) identifier assigned to a SIM card installed in the terminating mobile device 318, which mobile subscriber switching center or location area is currently servicing the terminating mobile device 318. The home location register 304 may also have access to information regarding services for which a subscriber associated with the terminating mobile device 318 is authorized to access. The signal transfer point 306 is a router used to route messages within the mobile telephony system 300. The service control point 308 communicates with the terminating mobile device 318 in order to provide various services at the terminating mobile device 318 in addition to telephony services. The external short message entity 314 is configured to connect to a short message service center (SMSC) in order to transmit SMS messages to mobile devices.

As mentioned above, the mobile subscriber switching centers 302, 320, the home location register 304, the signal transfer point 306, the service control point 308, the external short messaging entity 314, and the IP router 316 may include additional features not described herein but that are known to those of ordinary skill in the art of mobile telephony systems. As the traditional features of these elements are well-known in the art of mobile telephony, extensive further discussion of these elements aside from the new functionality disclosed herein has been omitted for brevity.

The system 300 may also include a cache data store 310 and a caller data store 312. The cache data store 310 may be configured to hold mirror cache information, wherein mirror cache information replicates information cached on the terminating mobile device 318. The mirror cache information may be used to more efficiently determine when additional caller data should be transmitted to the terminating mobile device 318, as further discussed below. The caller data store 312 may be configured to store additional caller data to be transmitted to the terminating mobile device 318. The caller may be able to specify, using a web page provided by the mobile telephony system 300, a mobile application, and/or via any other suitable technique, what caller data is stored in the caller data store 312 and may be transmitted to terminating mobile devices. For example, a caller may upload an image, such as a picture of the caller, a logo associated with the caller, and/or any other suitable image, for storage in the caller data store 312. As another example, a caller may upload other information, such as a full name, a business card, an associated company, an email address, a mailing address, and/or any other type of information the caller wishes to be delivered to mobile devices to be displayed before calls made by the caller. The caller data stored in the caller data store 312 may then be transmitted to the terminating mobile device 318 when the caller places a call to the terminating mobile device 318, and presented to the user of the terminating mobile device 318 as call screening data.

Figure 4A:
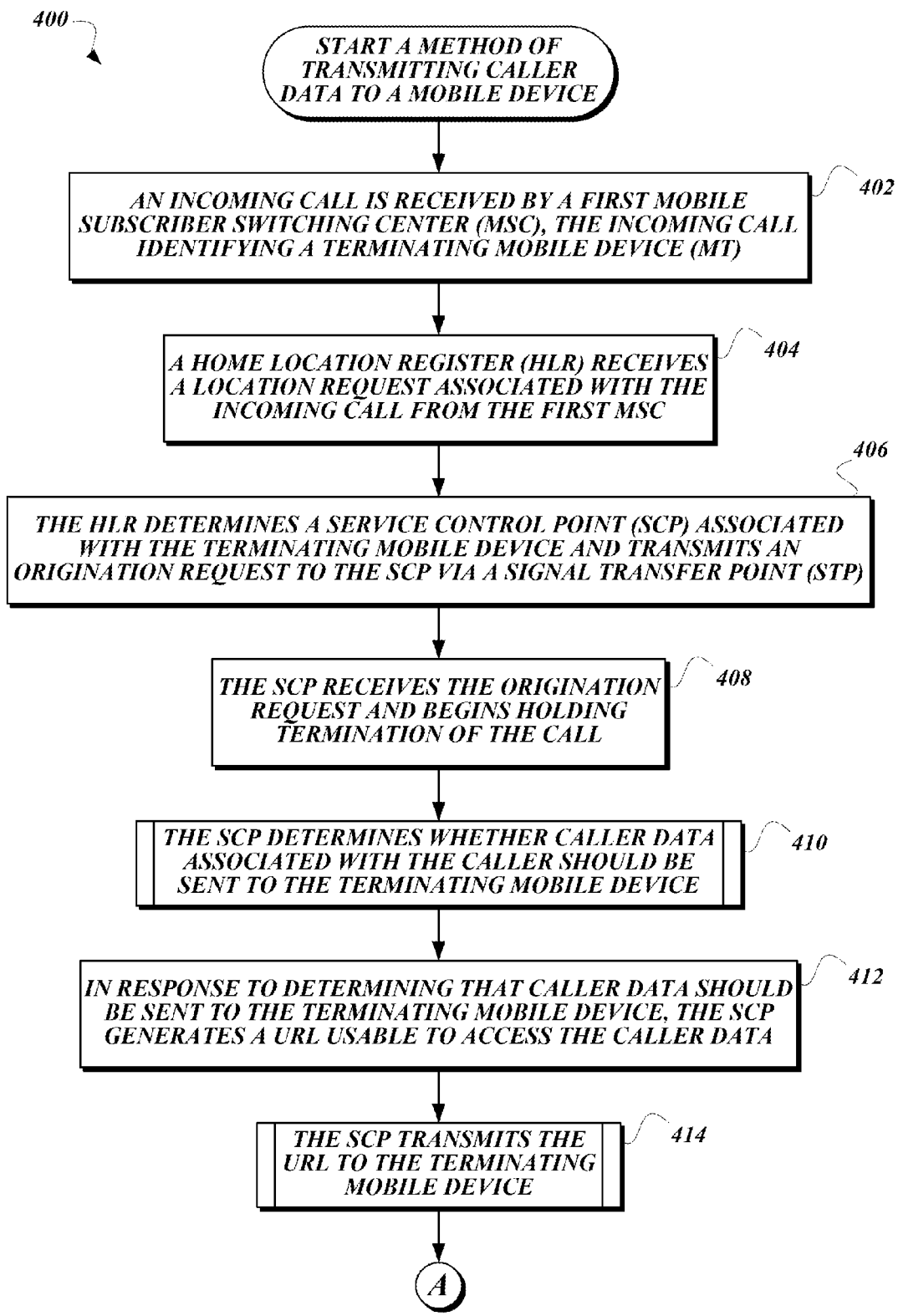
FIGS. 4A-4B are a flowchart that illustrates an exemplary embodiment of a method of transmitting caller data to a mobile device according to various aspects of the present disclosure.
Figure 4B:
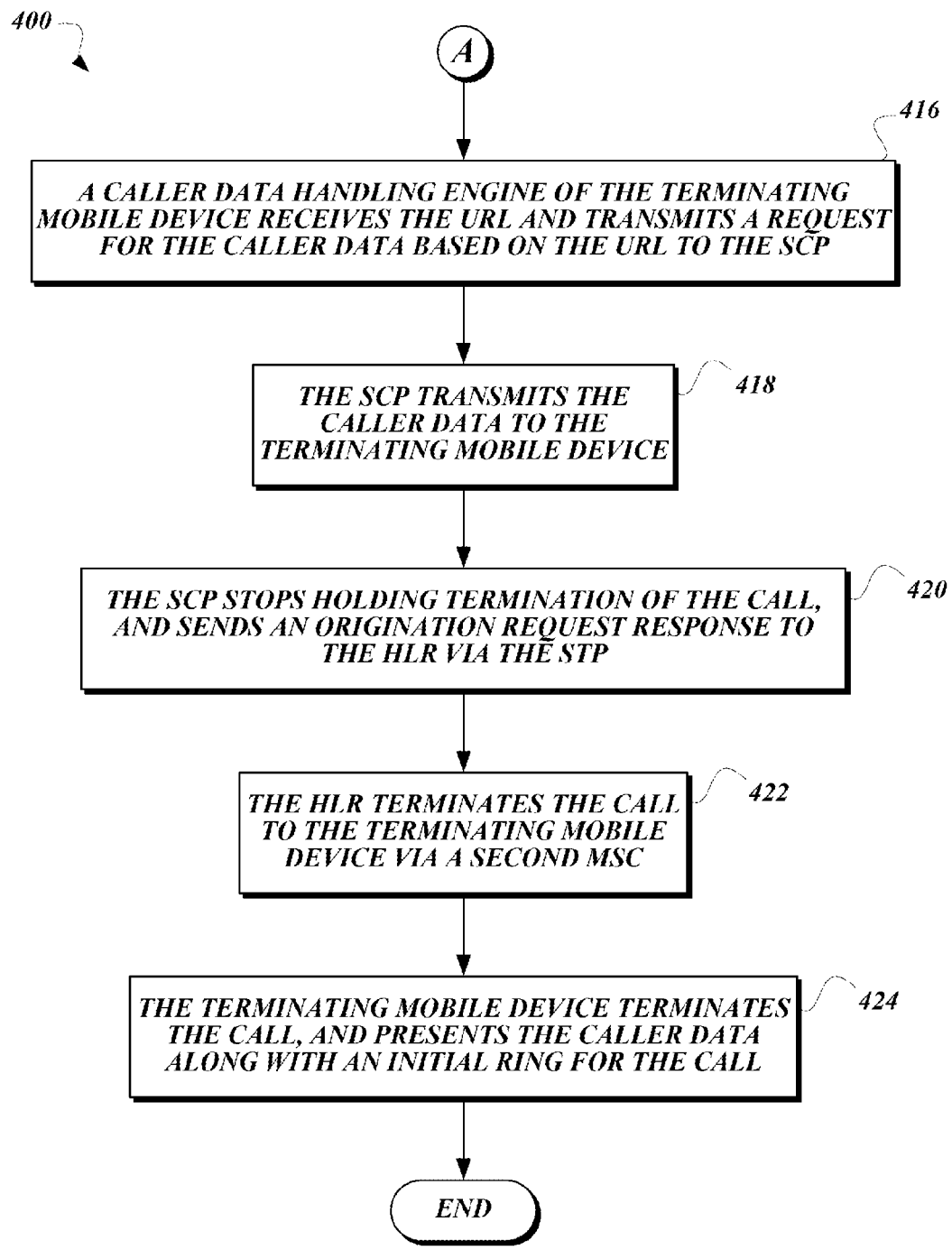

FIGS. 4A-4B are a flowchart that illustrates an exemplary embodiment of a method 400 of transmitting caller data to a mobile device 318 according to various aspects of the present disclosure. From a start block 402, the method 400 proceeds to block 402, where an incoming call is received by a first mobile subscriber switching center 302, the incoming call identifying a terminating mobile device 318. In some embodiments, the incoming call may be represented by a call page. The call page may include a mobile dialing number (MDN) that is associated with the terminating mobile device 318, and may be used to identify the terminating mobile device 318.

At block 404, a home location register 304 receives a location request associated with the incoming call from the first mobile subscriber switching center 302. In FIG. 3, this communication is illustrated by arrow number 1. The location request includes information for identifying the terminating mobile device 318, such as the mobile dialing number. The method 400 then proceeds to block 406, where the home location register 304 determines a service control point 308 associated with the terminating mobile device 318 and transmits an origination request to the service control point 308 via a signal transfer point 306. This communication is illustrated in FIG. 3 by arrow number 2 and arrow number 3. The origination request (sometimes referred to as an "ORIGREQ" message) includes at least a portion of the information for identifying the terminating mobile device 318.

At block 408, the service control point 308 receives the origination request and begins holding termination of the call for further processing relating to the caller data to be performed. A carrier associated with the calling mobile device may utilize predetermined timing thresholds for the overall amount of time for termination of the call to be successfully completed. Hence, in some embodiments of the present disclosure, it may be desirable to minimize the amount of time for which the service control point 308 holds termination of the call. At block 410, the service control point 308 determines whether caller data associated with the caller should be sent to the terminating mobile device 318. Further description of an exemplary procedure usable to determine whether caller data should be sent to the terminating mobile device 318 is provided below in FIG. 5 and the accompanying text.

The method 400 illustrated in FIGS. 4A-4B assumes that the service control point 308 determines that caller data should be sent to the terminating mobile device 318. If, instead, the service control point 308 determines that caller data should not be sent to the terminating mobile device 318, the method 400 may proceed to block 420 where the call is terminated without sending caller data. Assuming that, at block 410, the service control point 410 determined that caller data should be sent to the terminating mobile device 318, the method 400 proceeds to block 412. At block 412, in response to determining that caller data should be sent to the terminating mobile device 318, the service control point 308 generates a Uniform Resource Locator (URL) usable to access the caller data, and at block 414, the service control point 308 transmits the URL to the terminating mobile device 318.

The URL may direct the terminating mobile device 318 to any location from which the caller data may be obtained. In the illustrated embodiment, the URL directs the terminating mobile device 318 to obtain the caller data directly from the service control point 308 over a data channel via an IP router 316, as indicated by arrow number 5. In other embodiments, the URL could point the terminating mobile device 318 to a server other than the service control point 308 that makes the caller data available.

The URL may be transmitted to the terminating mobile device 318 via any suitable technique. In some embodiments, the URL may be transmitted via an application-directed short message (AD-SMS). As illustrated in FIG. 3, the service control point 308 may instruct an external short messaging entity (ESME) 314 to send an AD-SMS containing the URL to the terminating mobile device 318. This communication is illustrated by arrow number 4. However, if the external short messaging entity 314 is not operated by the same entity as the service control point 308 (or for other reasons), the delivery of the AD-SMS may take longer than desirable, and may result in either the termination of the call being held for too long, or in the caller data not being obtained by the terminating mobile device 318 in time to be presented along with the incoming call. In some embodiments, faster techniques for delivering the URL to the terminating mobile device 318 may be used. For example, if a data connection between the service control point 308 (or other server providing the caller data) is currently open or active, the URL may be sent directly to the terminating mobile device 318 over that data connection. Further description of an exemplary procedure usable to create a warm socket data connection for transmitting the URL to the terminating mobile device 318 over such a data channel is provided below in FIGS. 7, 6A, 6B, and the accompanying text.

From block 414, the method 400 proceeds to a continuation terminal ("terminal A"). From terminal A (FIG. 4B), the method 400 proceeds to block 416, where a caller data handling engine 204 of the terminating mobile device 318 receives the URL and transmits a request for the caller data based on the URL to the service control point 308. The caller data handling engine 204 may use a data connection, such as the connection illustrated in FIG. 3 by arrow number 5, to transmit the request for caller data. In some embodiments, the URL may refer the terminating mobile device 318 to the service control point 308 to request the caller data, while in other embodiments, the URL may refer to a server other than the service control point 308, such as a server specialized to provide caller data and/or the like. At block 418, the service control point 308 transmits the caller data to the terminating mobile device 318. In some embodiments, once the caller data is received by the terminating mobile device 318, the caller data handling engine 204 may store the caller data in the local caller data store 206. In some embodiments, once the caller data is received by the terminating mobile device 318, the caller data handling engine 204 may provide the caller data to the display engine 210 when appropriate, with or without storing the caller data in the local caller data store 206.

After the actions associated with block 418 occur and the caller data has been transmitted to the terminating mobile device 318, termination of the call may proceed normally. Accordingly, at block 420, the service control point 308 stops holding termination of the call, and sends an origination request response to the home location register 304 via the signal transfer point 306. This communication is illustrated in FIG. 3 by arrow number 6 and arrow number 7. At block 422, the home location register 304 terminates the call to the terminating mobile device 318 via a second mobile subscriber switching center 320. This communication is illustrated in FIG. 3 by arrow number 8 and arrow number 9. One of ordinary skill in the art will recognize that the actions of block 420 and block 422 are similar to the termination of a call in a traditional system.

At block 424, the terminating mobile device 318 terminates the call, and presents the caller data along with an initial ring for the call. For example, if the caller data includes a picture associated with the caller, the call handling engine 202 of the terminating mobile device 318 may cause the display engine 210 to present the picture along with the incoming call notification. In some embodiments, multiple types of information may be included in the caller data, such as the aforementioned picture, full name information, executable code or other interactive functionality, and/or the like. The method 400 then proceeds to an end block and terminates.

One of ordinary skill in the art will recognize that much of the communication that takes place during the method 400 and illustrated in FIG. 3 is similar to traditional techniques for terminating calls in mobile telephony systems. For example, the communication between the mobile subscriber switching centers 302, the home location register 304, the signal transfer point 306, the service control point 308, and the terminating mobile device 318 (denoted by arrow number 1, arrow number 2, arrow number 3, arrow number 6, arrow number 7, arrow number 8, and arrow number 9) may be similar to the aforementioned traditional techniques. The only alterations to a traditional system in order to implement some embodiments of the present disclosure may be made at the level of the service control point 308 (to support transmitting the caller data to the terminating mobile device 318) and at the terminating mobile device 318 itself (to support receiving, storing, and/or presenting the caller data). Accordingly, such embodiments of the present disclosure may be deployed to work within existing mobile telephony networks instead of having to deploy new networks to support the new functionality disclosed herein.

Deciding when to Transmit Caller Data

As discussed above, in some embodiments it may be desirable to minimize an amount of data transmitted to the terminating mobile device 318 to conserve system bandwidth, to lower an impact on a limited-use data plan, and/or for other reasons. The amount of transmitted data may be reduced by caching received caller data on the terminating mobile device 318 in a local caller data store 206. In some embodiments, the URL received by the terminating mobile device 318 may include or be transmitted along with information allowing the terminating mobile device 318 to decide whether to retrieve the caller data, such as an MDN, a version number, a last updated date, and/or the like. In such an embodiment, the terminating mobile device 318 may check the local caller data store 206 for cached caller data, and may determine whether to retrieve the caller data referenced by the URL based on whether the caller data is already stored in the local caller data store 206. In some embodiments, the service control point 308 may track information regarding what caller data has been cached by the terminating mobile device 318, and may decide that it is not necessary to transmit the URL or the caller data to the terminating mobile device 318 because the terminating mobile device 318 has previously cached a copy of the data.

Figure 5:
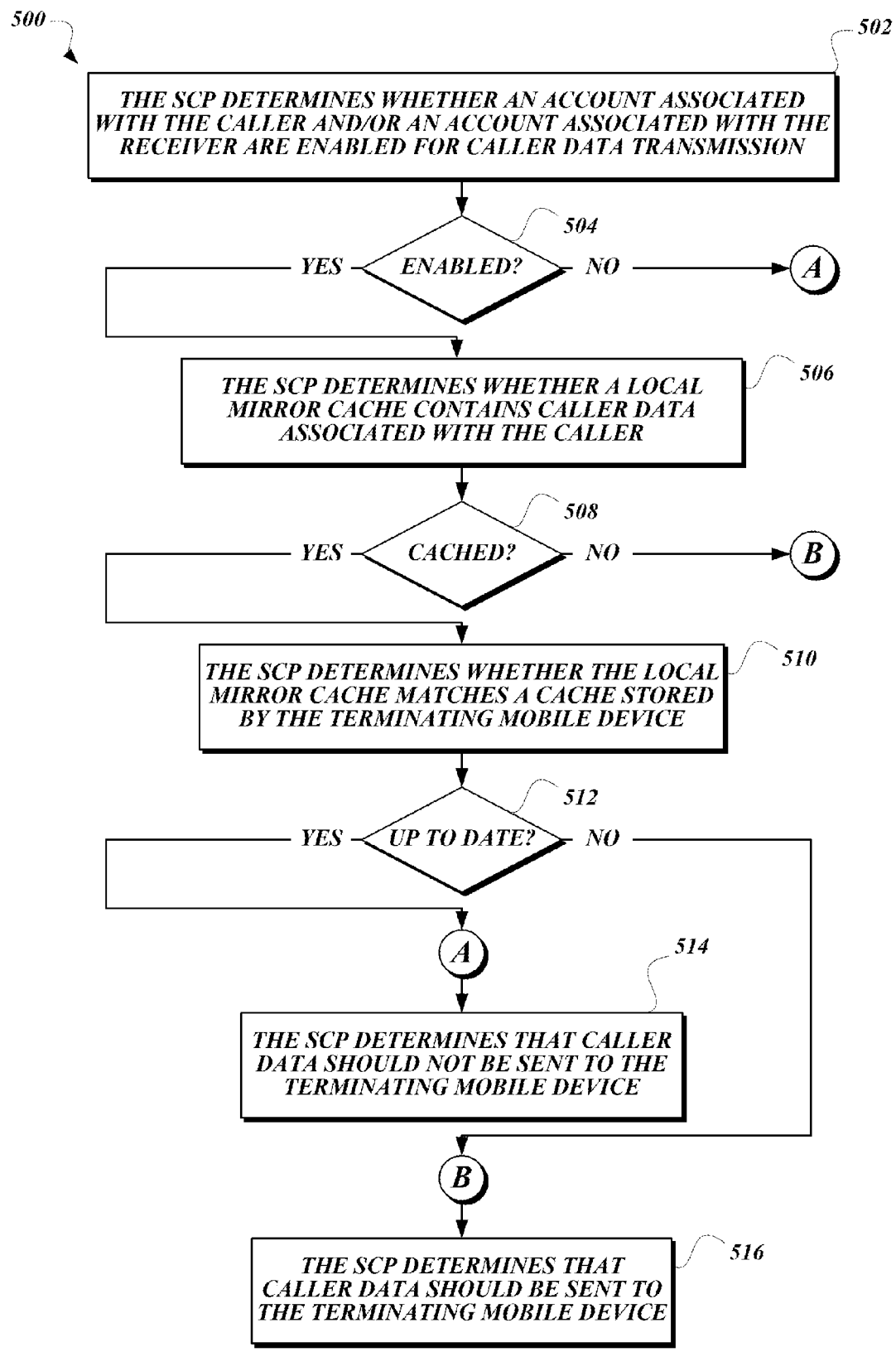
FIG. 5 is a flowchart that illustrates an exemplary embodiment of a procedure for determining whether caller data associated with the caller should be sent to the terminating mobile device according to various aspects of the present disclosure.

FIG. 5 is a flowchart that illustrates an exemplary embodiment of a procedure 500 for determining whether caller data associated with the caller should be sent to the terminating mobile device 318, according to various aspects of the present disclosure. The procedure 500 is an example of a suitable procedure for use at block 410 of the method 400 illustrated and discussed above.

In some embodiments, the caller and the receiver (a user associated with the terminating mobile device 318, or the terminating mobile device 318 itself) are each associated with a respective account with their respective carriers. Each account may include settings indicating one or more account features that are authorized for the account, such as text messaging, multimedia messaging, data tethering, and/or the like. These settings may include a setting that indicates whether the account is authorized for the transmission and/or reception of caller data. Thus, the procedure 500 begins at block 502, where the service control point 308 determines whether an account associated with the caller and/or an account associated with the receiver (a user associated with the terminating mobile device 318, or the terminating mobile device 318 itself) are authorized for caller data transmission.

At decision block 504, a test is performed to determine whether the caller and/or the receiver are enabled for caller data transmission. In some embodiments, both the caller and the receiver must be authorized for caller data transmission, while in other embodiments, authorization of either the caller or the receiver is sufficient. If the result of the test at decision block 504 is NO, then the procedure 500 proceeds to a continuation terminal ("terminal A"). Otherwise, if the result of the test at decision block 504 is YES, then the procedure 500 proceeds to block 506, where the service control point 308 determines whether a local mirror cache contains caller data associated with the caller. The local mirror cache is meant to reflect the contents of the local caller data store 206 on the terminating mobile device 318, and may be stored in the cache data store 310 so as to be easily accessible to the service control point 308.

At decision block 508, a test is performed to determine whether the local mirror cache contains the caller data. If the result of the test at decision block 508 is NO, then the procedure proceeds to a continuation terminal ("terminal B"). Otherwise, if the result of the test at decision block 508 is YES, then the procedure 500 proceeds to block 510, where the service control point 308 determines whether the local mirror cache matches a cache stored by the terminating mobile device 318. Though the local mirror cache is meant to reflect the contents of the local caller data store 206, it is possible that the caller data has been updated in the caller data store 312 since it was cached in the local caller data store 206, or that it has been removed or modified from the local caller data store 206. In some embodiments, the service control point 308 may determine whether the caches match by comparing a checksum of at least a portion of the local mirror cache to a checksum of at least a portion of the local caller data store 206. The checksum of the local caller data store 206 may be transmitted by the terminating mobile device 318 to the service control point 308 via a data connection. Alternatively, the checksum of the local mirror cache may be transmitted by the service control point 308 to the terminating mobile device 318 via an AD-SMS, a data connection, or via any other suitable technique. In such an embodiment, the terminating mobile device 318 may then reply to the service control point 308 with a message regarding whether the checksums match. The local mirror cache may be kept up to date via any suitable technique, such as requesting periodic updates from the terminating mobile device 318, adding information to the local mirror cache once transmitted to the terminating mobile device 318, and/or via any other suitable technique.

At decision block 512, a test is performed to determine whether the local mirror cache is up to date. If the result of the test at decision block 512 is YES, then the procedure 500 proceeds to a continuation terminal ("terminal A"). From terminal A, it has either been determined that the local mirror cache is up to date and that it contains the caller data, or that caller data transmission is not authorized. Accordingly, the procedure 500 proceeds to block 514, where the service control point 308 determines that caller data should not be sent to the terminating mobile device 318, and the procedure 500 ends.

Otherwise, if the result of the test at decision block 512 is NO, then the procedure 500 proceeds to a continuation terminal ("terminal B"). From terminal B, it has either been determined that the local mirror cache does not contain the caller data, or that the local mirror cache is not up to date. Accordingly, the procedure 500 proceeds to block 516, where the service control point 308 determines that caller data should be sent to the terminating mobile device 318, and the procedure ends.

Warm Socket Connections

As discussed above, in some embodiments, the service control point 308 may transmit the URL to the terminating mobile device 318 via a data connection. This may be a desirable technique for transmitting the URL to the terminating mobile device 318, because the transmission may be performed faster than with other techniques. However, forming data connections to mobile devices has particular challenges that are not necessarily present when forming data connections to other types of computing devices.

Figure 6A:
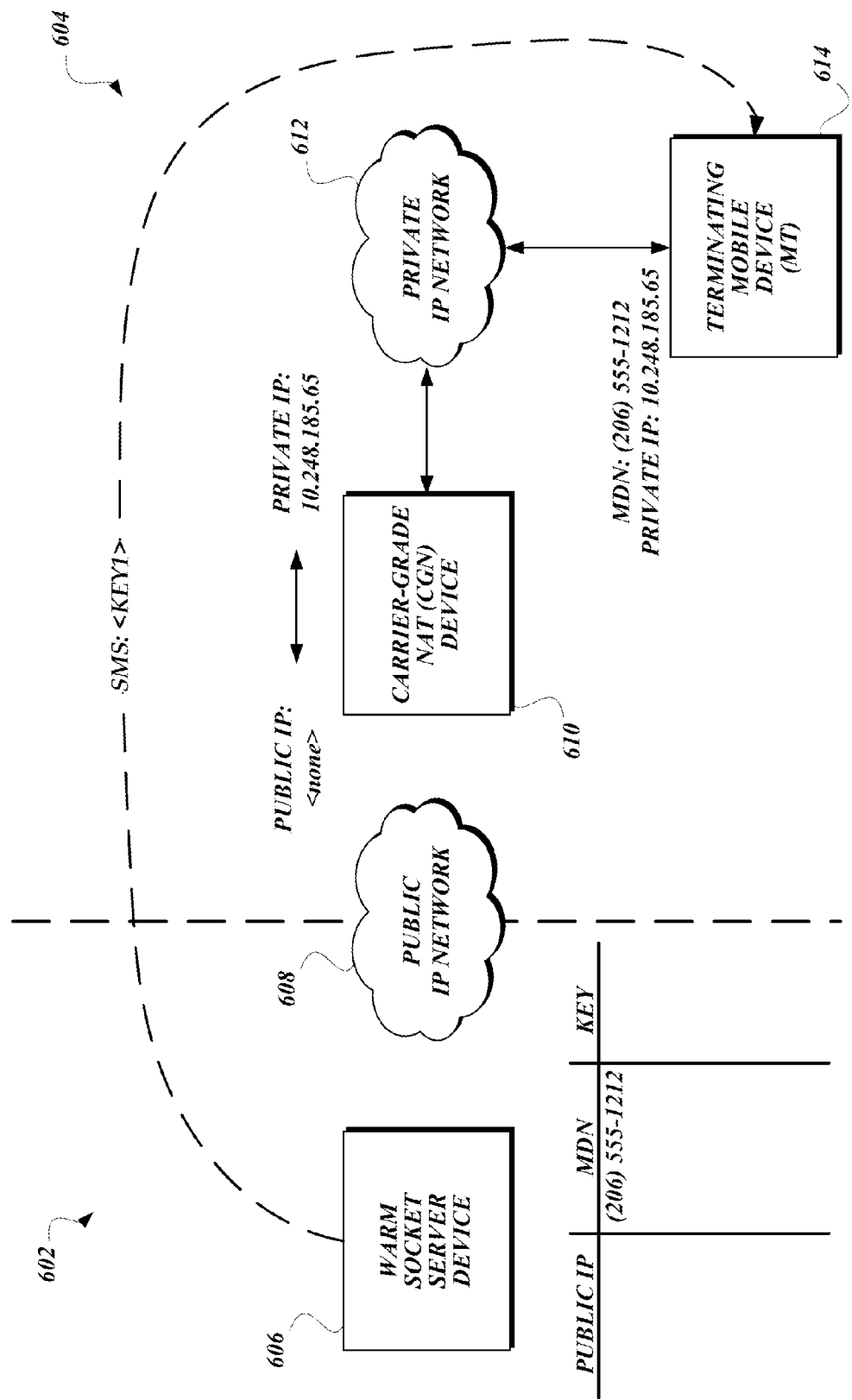
FIG. 6A is a schematic diagram that illustrates aspects of the formation of a data connection to a terminating mobile device according to various aspects of the present disclosure.

FIG. 6A is a schematic diagram that illustrates aspects of the formation of a data connection to a terminating mobile device 614 according to various aspects of the present disclosure. Components of a terminating carrier network 604 are illustrated to show a typical network topology for providing a terminating mobile device 614 with data access. The terminating mobile device 614 connects to a private IP network 612 via any suitable mobile data connection, such as Global System for Mobile Communications (GSM), code division multiple access (CDMA), general packet radio service (GPRS), 3G, 4G, Long-Term Evolution (LTE), and/or the like. The terminating mobile device 614 is associated with an MDN that identifies the terminating mobile device 614 for telephony purposes, and is assigned a private IP address that identifies the terminating mobile device 614 on the private IP network 612 for data communication purposes.

As understood by one of ordinary skill in the art of IP networking, the private IP address assigned to the terminating mobile device 614 only enables communication between the terminating mobile device 614 and other hosts on the private IP network 612. In order to communicate with a host outside of the terminating carrier network 604 (such as hosts elsewhere on the public Internet), a carrier-grade network address translation (CGN) device 610 is used. As understood by one of ordinary skill in the art, the CGN device 610 provides communication with one or more devices on the private IP network 612 by translating the private IP addresses to one or more public IP addresses. In some embodiments, more than one private IP address may be translated to a single public IP address, with the CGN device 610 maintaining the ability to direct incoming IP packets directed to the single public IP address to the appropriate device on the private IP network 612.

One difficulty in transmitting data associated with a call to the terminating mobile device 614 is that the service control point 308 attempting to transmit the data will not initially be aware of the public IP address assigned to the terminating mobile device 614. Indeed, the only addressing information initially available to the service control point 308 may be the MDN, which does not itself indicate an IP address at which the terminating mobile device 614 may be reached. In some embodiments, another difficulty may be that, even if the service control point 308 is aware of an IP address previously used by the terminating mobile device 614, the CGN device 610 may reclaim that IP address for use by a different device after a predetermined period of inactivity. Another difficulty, in some embodiments, may be that the CGN device 610 may not allow hosts on the public IP network 608 to initiate connections with devices on the private IP network 612.

To overcome these difficulties (and others), some embodiments of the present disclosure provide a warm socket server device 606 within a calling carrier network 602. In general, the warm socket server device 606 is configured to initiate a data connection with the terminating mobile device 614 based on the MDN of the terminating mobile device 614, and to maintain the data connection so that it is available on demand for sending caller data to the terminating mobile device 614. In FIG. 6A, the warm socket server device 606 is illustrated as storing a table to associate an MDN with a public IP address and a secret key. The warm socket server device 606 has received a request to open a warm socket connection with the terminating mobile device 614 based on the MDN, so the warm socket server device 606 has created an entry in the table for the MDN. At the point in time illustrated in FIG. 6A, the warm socket server device 606 has transmitted an SMS message to the terminating mobile device 614 using the MDN. The SMS message may include information usable for establishing and/or utilizing the warm socket connection, such as an IP address or URL of the warm socket server device 606, a shared secret key generated by the warm socket server device 606, and/or the like.

Figure 6B:
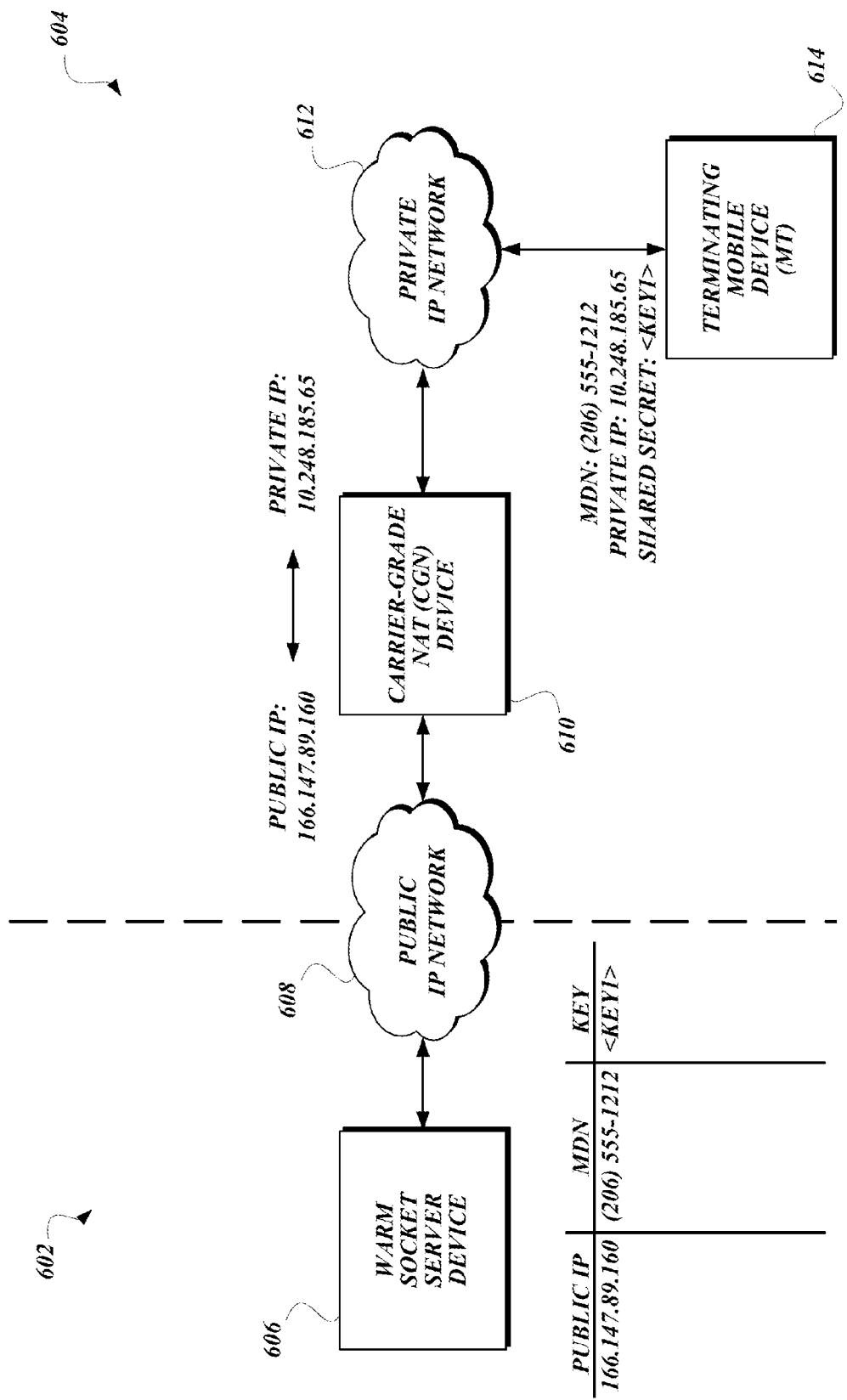
FIG. 6B is a schematic diagram that illustrates further aspects of forming the data connection to the terminating mobile device according to various aspects of the present disclosure.

FIG. 6B is a schematic diagram that illustrates further aspects of forming the data connection to the terminating mobile device 614 according to various aspects of the present disclosure. The terminating mobile device 614 has received the SMS illustrated in FIG. 6A, and stored the shared secret key for future use. As illustrated, the terminating mobile device 614 has opened a data connection to the warm socket server device 606 via any suitable technique. The data connection traverses the private IP network 612 to arrive at the CGN device 610. The CGN device 610 assigns a public IP address to the data connection, and connects to the warm socket server device 606 via a public IP network 608. Once established, the terminating mobile device 614 may send an acknowledgement to the warm socket server device 606, the acknowledgement including information that allows the warm socket server device 606 to associate the connection with the terminating mobile device, such as the MDN, the shared secret key, and/or the like. The warm socket server device 606 then updates the entry in the table to associate the MDN with the shared secret key and the public IP address assigned to the data connection.

The warm socket server device 606 may henceforth transmit data to the terminating mobile device 614 via the data connection. In some embodiments, the CGN device 610 may be configured to tear down the data connection and reassign the public IP address after a predetermined period of inactivity. Accordingly, the warm socket server device 606 and/or the terminating mobile device 614 may periodically transmit keep-alive messages using the data connection in order to prevent the CGN device 610 from tearing down the connection.

Figure 7:
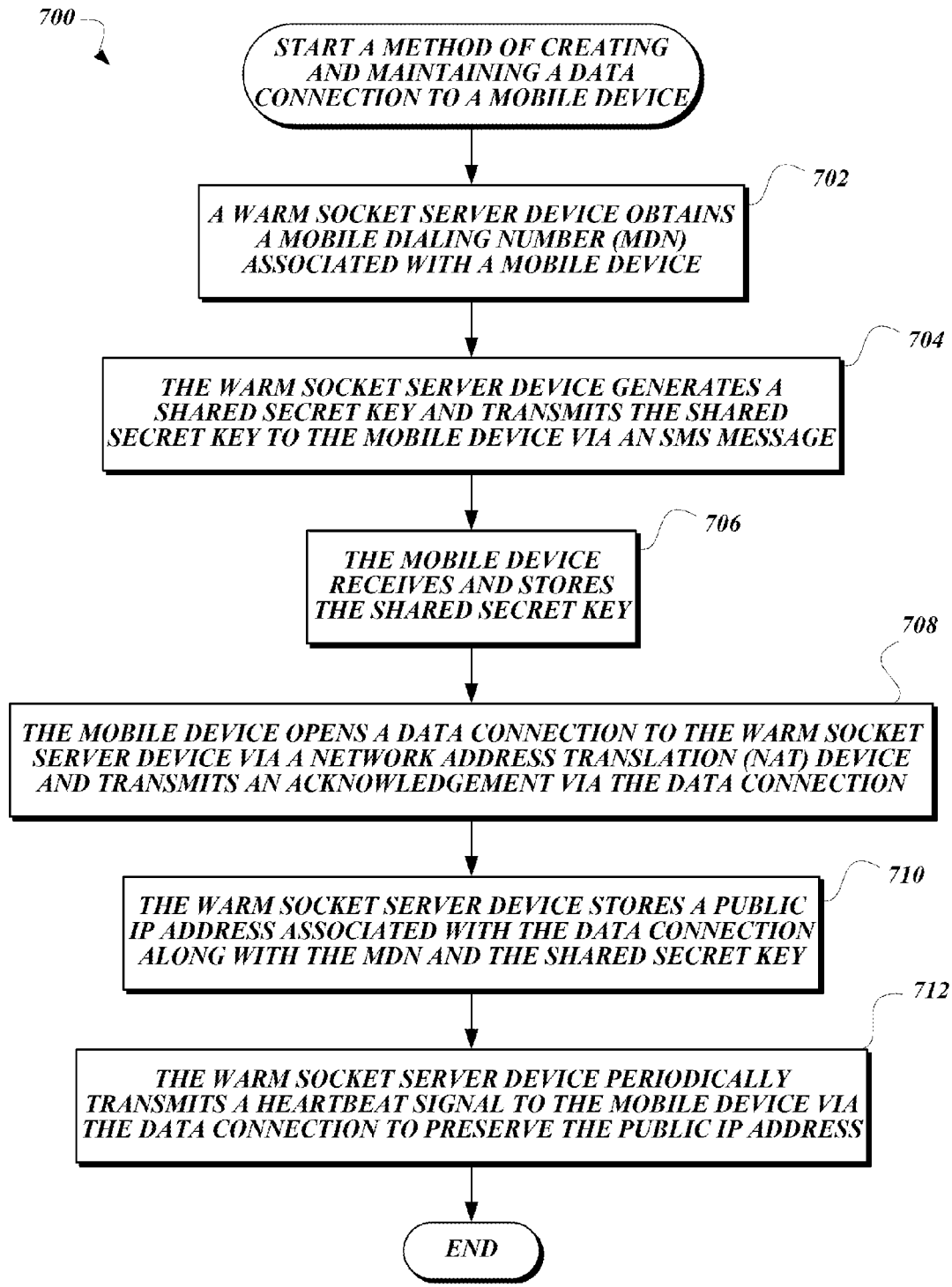
FIG. 7 is a flowchart that illustrates an exemplary embodiment of a method of creating and maintaining a data connection to a mobile device according to various aspects of the present disclosure.

FIG. 7 is a flowchart that illustrates an exemplary embodiment of a method 700 of creating and maintaining a data connection to a mobile device according to various aspects of the present disclosure. From a start block, the method 700 proceeds to block 702, where a warm socket server device 606 obtains a mobile dialing number (MDN) associated with a mobile device. The MDN may be obtained from a request made by a service control point 308, or by any other suitable technique. At block 704, the warm socket server device 606 generates a shared secret key and transmits the shared secret key to the mobile device via an SMS message. In some embodiments, the SMS message may be an application-directed SMS message, which may be received and processed by a caller data handling engine 204 without presenting a notification regarding the incoming message to the user.

Next, at block 706, the mobile device receives and stores the shared secret key. At block 708, the mobile device opens a data connection to the warm socket server device 606 via a network address translation (NAT) device (such as a CGN device 610 or the like) and transmits an acknowledgement via the data connection. In some embodiments, the acknowledgement may include the MDN associated with the mobile device, the shared secret key, and/or other information usable to identify the mobile device and/or the data connection.

Once the data connection is opened, the method 700 proceeds to block 710, where the warm socket server device 606 stores a public IP address associated with the data connection along with the MDN and the shared secret key. Subsequently, when a system providing the warm socket server device 606 wishes to transmit data to the mobile device, the public IP address and shared secret key may be obtained from storage using the MDN. The data may be transmitted to the public IP address, and the shared secret key may be used by the mobile device to verify that the received data is coming from the expected source (instead of from some other unauthorized source). At block 712, the warm socket server device 606 periodically transmits a heartbeat signal or other keep-alive signal to the mobile device via the data connection to preserve the public IP address. Otherwise, in some embodiments, the NAT device may tear down the connection after a predetermined period of inactivity is detected. The warm socket server device 606 may continue to send the heartbeat signals indefinitely, or for a predetermined amount of time. The method 700 then proceeds to an end block and terminates.

Exemplary Computing Device

FIG. 8 illustrates aspects of an exemplary computing device 800 appropriate for use with embodiments of the present disclosure. While FIG. 8 is described with reference to a computing device that is implemented as a device on a network, the description below is applicable to servers, personal computers, mobile phones, smart phones, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed packet switched network. However, any other suitable storage technique and/or device capable of quickly and reliably providing the stored data in response to queries may be used, and the computing device may be accessible locally instead of over a network, or may be accessible over some other type of suitable network or provided as a cloud-based service. A data store may also include data stored in an organized manner on a storage medium 808.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein.

Though headings may be used above to denote sections of the detailed description, these headings are provided for ease of discussion only. The headings do not denote separate embodiments, and in some embodiments, discussion from separate headings may be combined into a single embodiment of the present disclosure.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the disclosed subject matter.

The embodiments of the invention in which an exclusive property or privilege is claimed are defined as follows:

1. A computer-implemented method for transmitting call screening information to a terminating mobile device, the method comprising:
   receiving, by a computing device, an origination request associated with a call to the terminating mobile device;
   while holding termination of the call, transmitting, by the computing device, call screening information to the terminating mobile device; and
   transmitting, by the computing device, an origination request response to release termination of the call in response to determining that the call screening information was received by the terminating mobile device;
   wherein transmitting call screening information to the terminating mobile device includes transmitting a Uniform Resource Locator (URL) to the terminating mobile device, wherein the URL is usable by the terminating mobile device to retrieve the call screening information; and
   wherein transmitting the URL to the terminating mobile device includes transmitting an application-directed Short Message Service (SMS) message to the terminating mobile device, wherein the application-directed SMS message includes the URL.

2. The method of claim 1, wherein the call screening information includes a picture specified by a caller associated with the call.

3. The method of claim 1, wherein transmitting the URL to the terminating mobile device includes transmitting the URL to the terminating mobile device via a data channel.

4. The method of claim 3, wherein the data channel includes a warm socket.

5. The method of claim 1, further comprising determining, by the computing device, that the call screening information is not cached by the terminating mobile device before transmitting the call screening information to the terminating mobile device.

6. A mobile computing device configured to perform actions for presenting call screening information along with an initial ring of an incoming call, the actions comprising:
   receiving an application-directed Short Message Service (SMS) message including a shared secret from a warm socket server;
   storing the shared secret;
   transmitting a response to the warm socket server via a data connection;
   periodically receiving User Datagram Protocol (UDP) packets from the warm socket server via the data connection;
   receiving a Uniform Resource Locator (URL) identifying a location from which call screening information can be obtained;
   using the URL to obtain the call screening information;
   storing the call screening information in a local data store;
   receiving a call page associated with the incoming call, wherein the call page includes an inbound mobile dialing number;
   using the inbound mobile dialing number to retrieve the call screening information from the local data store; and
   presenting the call screening information to a user of the mobile computing device before the user picks up the incoming call.

7. The mobile computing device of claim 6, wherein presenting the call screening information to a user of the mobile computing device includes presenting the call screening information along with a first ring of the call.

8. The mobile computing device of claim 6, wherein receiving the URL identifying the location from which call screening information can be obtained includes receiving an application-directed Short Message Service (SMS) message that includes the URL.

9. The mobile computing device of claim 6, wherein receiving the URL identifying the location from which call screening information can be obtained includes receiving the URL via a data connection.

10. The mobile computing device of claim 6, wherein using the URL to obtain the call screening information includes using the URL to obtain the call screening information via a data connection.

11. The mobile computing device of claim 6, wherein the call screening information includes a picture specified by a caller associated with the incoming call.

12. The mobile computing device of claim 6, wherein using the URL to obtain the call screening information includes using the shared secret and the URL to obtain the call screening information.

13. A computing device, comprising:
- at least one processor; and
- a non-transitory computer-readable medium having computer-executable instructions stored thereon that, in response to execution by the at least one processor, cause the computing device to perform actions for transmitting call screening information to a terminating mobile device, the actions comprising:
- receiving an origination request associated with a call to the terminating mobile device;
- while holding termination of the call, transmitting call screening information to the terminating mobile device; and
- transmitting an origination request response to release termination of the call in response to determining that the call screening information was received by the terminating mobile device;
- wherein transmitting call screening information to the terminating mobile device includes transmitting a Uniform Resource Locator (URL) to the terminating mobile device, wherein the URL is usable by the terminating mobile device to retrieve the call screening information; and
- wherein transmitting the URL to the terminating mobile device includes transmitting an application-directed Short Message Service (SMS) message to the terminating mobile device, wherein the application-directed SMS message includes the URL.

14. The computing device of claim 13, wherein the call screening information includes a picture specified by a caller associated with the call.

15. The computing device of claim 13, wherein transmitting the URL to the terminating mobile device includes transmitting the URL to the terminating mobile device via a data channel that includes a warm socket.

16. A mobile computing device configured to perform actions for presenting call screening information along with an initial ring of an incoming call, the actions comprising:
- receiving an application-directed Short Message Service (SMS) message including a shared secret from a warm socket server;
- storing the shared secret;
- transmitting a response to the warm socket server via a data connection;
- receiving a Uniform Resource Locator (URL) identifying a location from which call screening information can be obtained;
- using the URL to obtain the call screening information, wherein using the URL to obtain the call screening information includes using the shared secret and the URL to obtain the call screening information;
- storing the call screening information in a local data store;
- receiving a call page associated with an incoming call, wherein the call page includes an inbound mobile dialing number;
- using the inbound mobile dialing number to retrieve the call screening information from the local data store; and
- presenting the call screening information to a user of the mobile computing device before the user picks up the incoming call.

* * * * *